(12) United States Patent
Temmesfeld

(10) Patent No.: US 9,337,580 B2
(45) Date of Patent: May 10, 2016

(54) LOCKING DEVICE FOR LOCKING ELECTRICAL PLUGS

(71) Applicant: TEMTEC FAHRZEUGTECHNIK ENTWICKLUNGSGESELLSCHAFT MBH, Raubling (DE)

(72) Inventor: Thomas Temmesfeld, Raubling (DE)

(73) Assignee: TEMTEC FAHRZEUGTECHNIK ENTWICKLUNGSGESELLSCHAFT MBH, Raubling (DE)

( * ) Notice: Subject to any disclaimer, the term of this patent is extended or adjusted under 35 U.S.C. 154(b) by 0 days.

(21) Appl. No.: 14/441,600

(22) PCT Filed: Nov. 14, 2013

(86) PCT No.: PCT/EP2013/003435
§ 371 (c)(1),
(2) Date: May 8, 2015

(87) PCT Pub. No.: WO2014/075802
PCT Pub. Date: May 22, 2014

(65) Prior Publication Data
US 2015/0295355 A1    Oct. 15, 2015

(30) Foreign Application Priority Data

Nov. 15, 2012 (DE) .................... 10 2012 022 413

(51) Int. Cl.
*H01R 13/62* (2006.01)
*H01R 13/639* (2006.01)
*B60L 3/00* (2006.01)
(Continued)

(52) U.S. Cl.
CPC ............ *H01R 13/639* (2013.01); *B60L 3/0061* (2013.01); *B60L 3/04* (2013.01); *B60L 11/1818* (2013.01); *B60L 2270/32* (2013.01); *B60L 2270/34* (2013.01); *H01R 13/6395* (2013.01);
(Continued)

(58) Field of Classification Search
CPC ........... H01R 13/6397; H01R 13/6275; H01R 2201/26; H01R 13/639; H01R 13/447
See application file for complete search history.

(56) References Cited

U.S. PATENT DOCUMENTS 5,344,331 A * 9/1994 Hoffman ............. B60L 11/1818
439/138
5,758,414 A    6/1998 Ehrenfels
(Continued)

FOREIGN PATENT DOCUMENTS

| DE | 10 2010 023 784 | 12/2011 |
| EP | 2 293 391 | 3/2011 |
| EP | 2 492 134 | 8/2012 |

OTHER PUBLICATIONS

International Search Report for PCT/EP2013/003435 mailed Sep. 1, 2014, 3 pages.
(Continued)

*Primary Examiner* — Truc Nguyen
(74) *Attorney, Agent, or Firm* — Nixon & Vanderhye P.C.

(57) ABSTRACT

A locking device for locking electrical plugs in sockets has a rotational track element which can be driven by a motor and on which a guide track is provided around the axis of rotation thereof, said guide track being provided with a plurality of track sections that have different pitches. A sliding element has a track engagement part that engages in the guide track and that can be displaced parallel to the axis of rotation of the rotational track element by rotation of the rotational track element.

12 Claims, 7 Drawing Sheets

(51) Int. Cl.
*B60L 3/04* (2006.01)
*B60L 11/18* (2006.01)

(52) U.S. Cl.
CPC .......... *Y02T 10/7005* (2013.01); *Y02T 10/7072* (2013.01); *Y02T 90/14* (2013.01)

(56) References Cited

U.S. PATENT DOCUMENTS

| | | | | |
|---|---|---|---|---|
| 8,523,589 B2* | 9/2013 | Kurumizawa | ...... | H01R 13/6275 439/304 |
| 8,678,847 B2* | 3/2014 | Inoue | .................. | B60L 11/1818 439/352 |
| 8,845,354 B2* | 9/2014 | Kurumizawa | ........ | H01R 13/639 439/347 |
| 2003/0045151 A1* | 3/2003 | Josquin | ............... | F21S 48/1109 439/280 |
| 2011/0294328 A1 | 12/2011 | Katagiri et al. | | |
| 2011/0306223 A1* | 12/2011 | Bauer | .................. | H01R 13/447 439/136 |
| 2013/0252448 A1* | 9/2013 | Schulte | .............. | H01R 13/6397 439/304 |

OTHER PUBLICATIONS

Written Opinion of the International Searching Authority (foreign language) for PCT/EP2013/003435, mailed Sep. 1, 2014, 5 pages.

\* cited by examiner

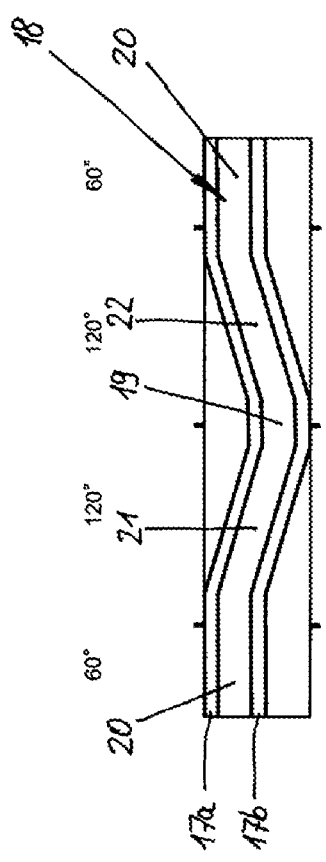
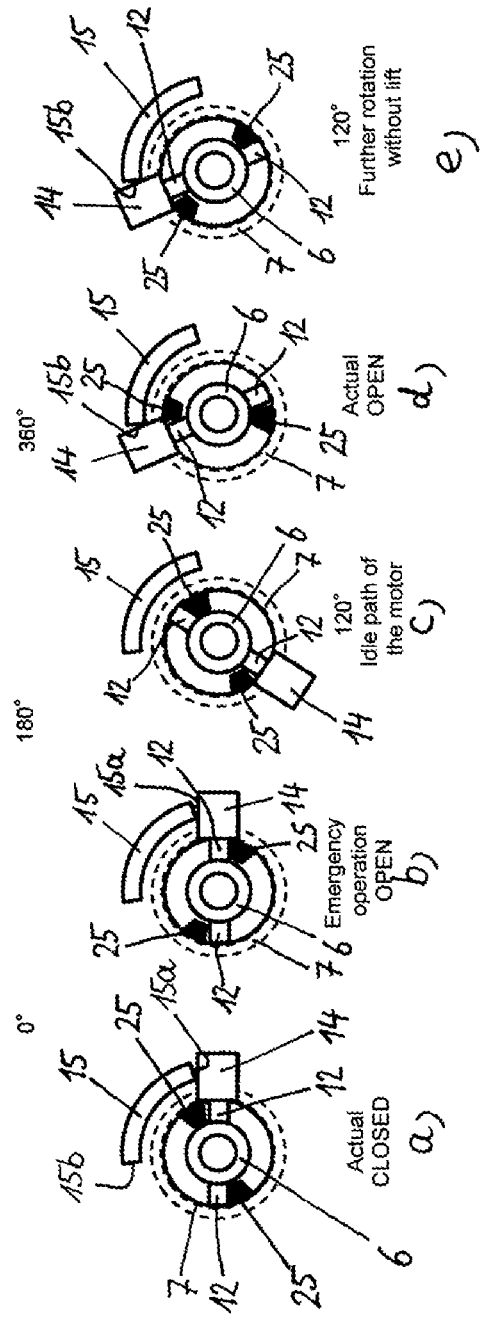
Fig. 7
Fig. 8

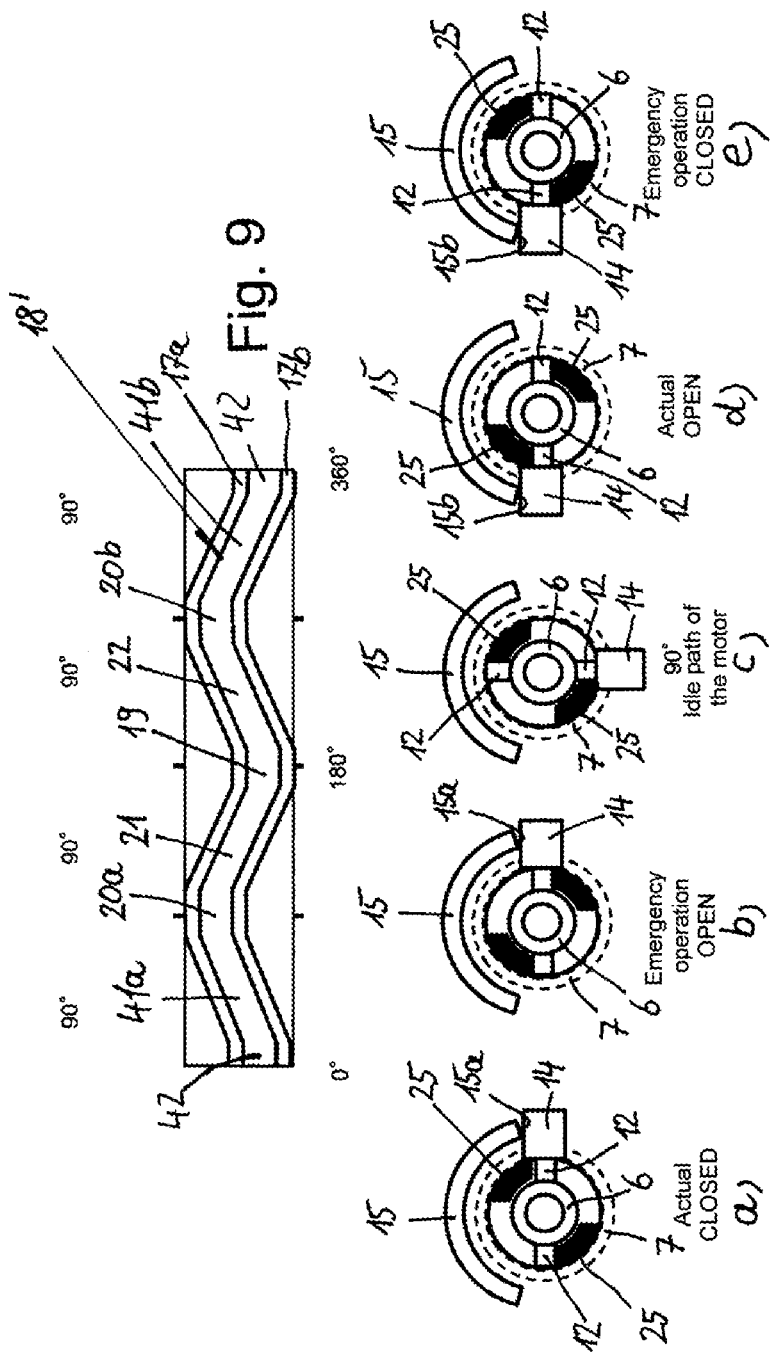

LOCKING DEVICE FOR LOCKING ELECTRICAL PLUGS

This application is the U.S. national phase of International Application No. PCT/EP2013/003435 filed 14 Nov. 2013, which designated the U.S. and claims priority to DE Patent Application No. 10 2012 022 413.3 filed 15 Nov. 2012, the entire contents of each of which are hereby incorporated by reference.

The invention relates to a locking device for locking electrical plugs in sockets according to the preamble of claim 1.

To charge electric vehicles, said vehicles are connected via a charging cable to a charging station, which is connected to a power source. For this purpose, the charging cable comprises a plug on its vehicle-side end, which plug can be inserted into a socket (power point) provided on the vehicle. The plug may also be located on the vehicle and the socket on the charging cable. A push-on coupling may also be provided between the charging cable and the charging station.

It should be possible to lock push-on couplings of this type during charging so that the charging cable can be prevented from being released from the vehicle or from the charging station in an unauthorised manner. This is particularly important for charging vehicles, since the vehicles often remain connected to the charging station for a long period of time, that is to say several hours, and the driver generally leaves the vehicle during the charging process. Safety means are therefore desirable which prevent the charging cable from being removed from the vehicle during the charging process in an unauthorised manner and from being connected to another vehicle. In addition, locking the plug is intended to stop the plug from being able to be pulled out of the socket during charging, in order to prevent arcing.

DE 10 2010 023 784 A1 already discloses a locking device of the type mentioned at the outset. In this known locking device, a slider which is arranged to the side of a socket and can move in the longitudinal direction is driven by a motor via an articulated lever, which motor simultaneously pivots a covering cap between an open and closed position. The slide element cooperates with a locking bolt which can move transversely to the slide element between an unlocking position and a locking position by means of a locking-bolt guide link, in which locking position the locking bolt penetrates a wall of the socket and also projects into an opening in the inserted plug, so that said plug can no longer be pulled out. However, this known locking device requires a relatively large amount of space, particularly if it is intended to be designed for relatively high driving forces. Furthermore, it is often not necessary to also actuate a covering cap together with the locking device.

The problem addressed by the invention is therefore that of providing a locking device of the type mentioned at the outset which requires a small amount of space, can develop relatively high driving forces for the locking bolt, is as universally applicable as possible and is also designed such that manual emergency unlocking is possible in a simple manner in the event that the motor fails.

This problem is solved according to the invention by a locking device having the features of claim 1. Advantageous embodiments of the invention are described in the additional claims.

In the locking device according to the invention, the rotary element is formed as a rotary link element comprising a guide link which is arranged around the rotational axis thereof and comprises a plurality of link portions which have different inclinations. Furthermore, the slide element comprises a link engagement part which engages in the guide link and can move in parallel with the rotational axis of the rotary link element by rotating the rotary link element.

By means of the locking device according to the invention, a compact drive unit can be provided which can be easily integrated into a vehicle. Furthermore, the locking device can be cost-effectively produced. It is also advantageous that, despite its small size, high driving forces can be generated, which act on the slide element and are transferred from there to the locking bolt. Furthermore, the locking device can readily be configured such that it not only provides locking between the plug and the socket, but also locking of covering caps.

Advantageously, the motor consists of a geared motor which comprises a planetary gear train for reducing the motor speed. A particularly great reduction in speed can be brought about by means of a planetary gear train of this type. Therefore, relatively small and cost-effective motors are sufficient to generate high driving forces. As an alternative to a planetary gear train of this type, it is however also possible in principle to use other types of gear train.

Advantageously, a rotary free-wheel is provided between the motor and the rotary link element and decouples the rotational movement of the motor from that of the rotary link element over a predetermined free-wheeling angular range. Using a rotary free-wheel of this type, the motor can first start up over a certain angular range without being rigidly coupled to the subsequent force-transmission elements, that is to say without great resistance. The rotary free-wheel is therefore advantageous for the start-up behaviour of the electric motor and for relieving the static friction of the subsequent force-transmission elements.

Advantageously, the rotary free-wheel comprises a rotatable entraining element which can be driven by the motor and comprises at least one stop which can be brought into entraining engagement with a counter-stop of the rotary link element at either end of the free-wheeling angular range. As a result, the rotary free-wheel can be produced in a structurally simple and cost-effective manner.

Advantageously, the entraining element is arranged within the rotary link element at least in part. As a result, a very compact arrangement can be provided.

Advantageously, the guide link of the rotary link element comprises at least one non-inclined zero-lift portion which extends at right angles to the rotational axis. As a result, the locking bolt can be prevented, in a simple manner, from automatically moving between its locking position and unlocking position when the motor is switched off.

Advantageously, the motor, entraining element and rotary link element are arranged in succession along a common rotational axis. As a result, a very compact arrangement is provided.

Advantageously, the rotary link element is connected to an emergency rotary element for manually rotating the rotary link element. As a result, if the motor fails, manual, mechanical emergency unlocking can be provided in a simple manner which allows the locking bolt to be manually transferred into its unlocking position.

Advantageously, the slide element can be moved in parallel with the rotational axis of the rotary link element and the slide element is arranged so as to be adjacent to the motor. As a result, a very compact arrangement can be provided and the coupling between the slide element and the rotary link element can be produced in a simple manner by means of a transversely extending link engagement part, in particular a transverse bolt which is attached to the slide element.

Advantageously, the slide element comprises at least one locking-bolt guide link. Furthermore, at least one locking bolt is movably mounted relative to the slide element and is in engagement with the locking-bolt guide link such that the locking bolt can be moved in and out of locking engagement with the plug or the socket by a movement of the slide element. As a result, an arrangement is provided in which the locking bolt can be moved in particular transversely to the movement direction of the slide element. In addition to a locking bolt of this type, an additional locking bolt may also be provided, which can be moved by the slide element in parallel with the sliding direction of the slide element in order to also close a covering cap, for example.

The invention is explained in greater detail in the following by way of example on the basis of the drawings, in which:

FIG. 7 shows the progression of the guide link;

FIGS. 8a to 8e are schematic plan views of the rotary link element and the entraining element to illustrate possible relative movements;

FIG. 9 shows the progression of a second embodiment of a guide link;

FIGS. 10a to 10e are schematic plan views of the rotary link element which comprises the guide link from FIG. 9 and an entraining element to illustrate possible relative movements;

Figure 1:
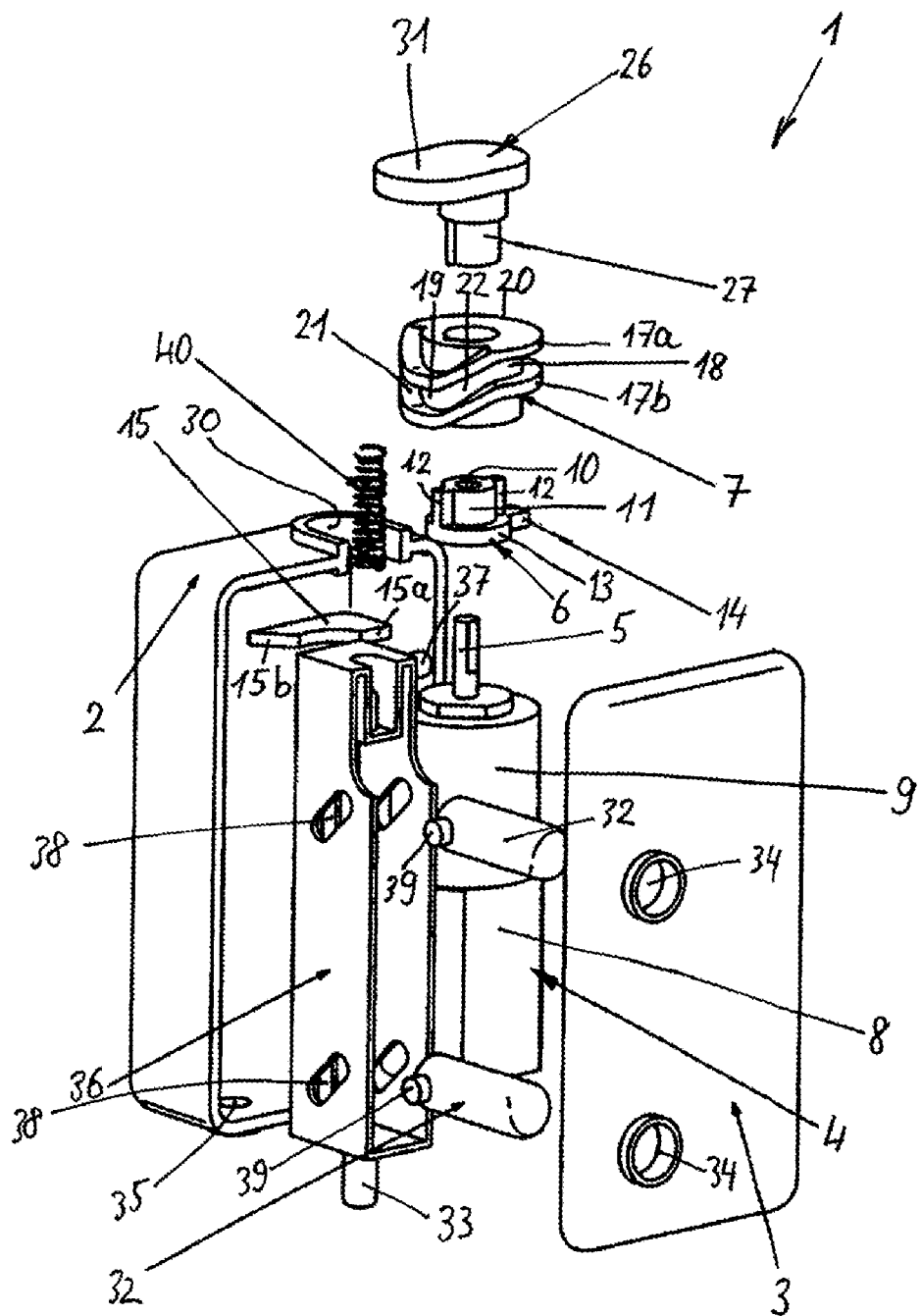
FIG. 1 is a three-dimensional exploded view of the locking device according to the invention.

In FIG. 1, a locking device 1 comprising a shell-like lower housing part 2 can be seen which can be closed by means of a housing cover 3. The lower housing part 2 and the housing cover 3 together form a substantially cuboid housing.

Figure 2:
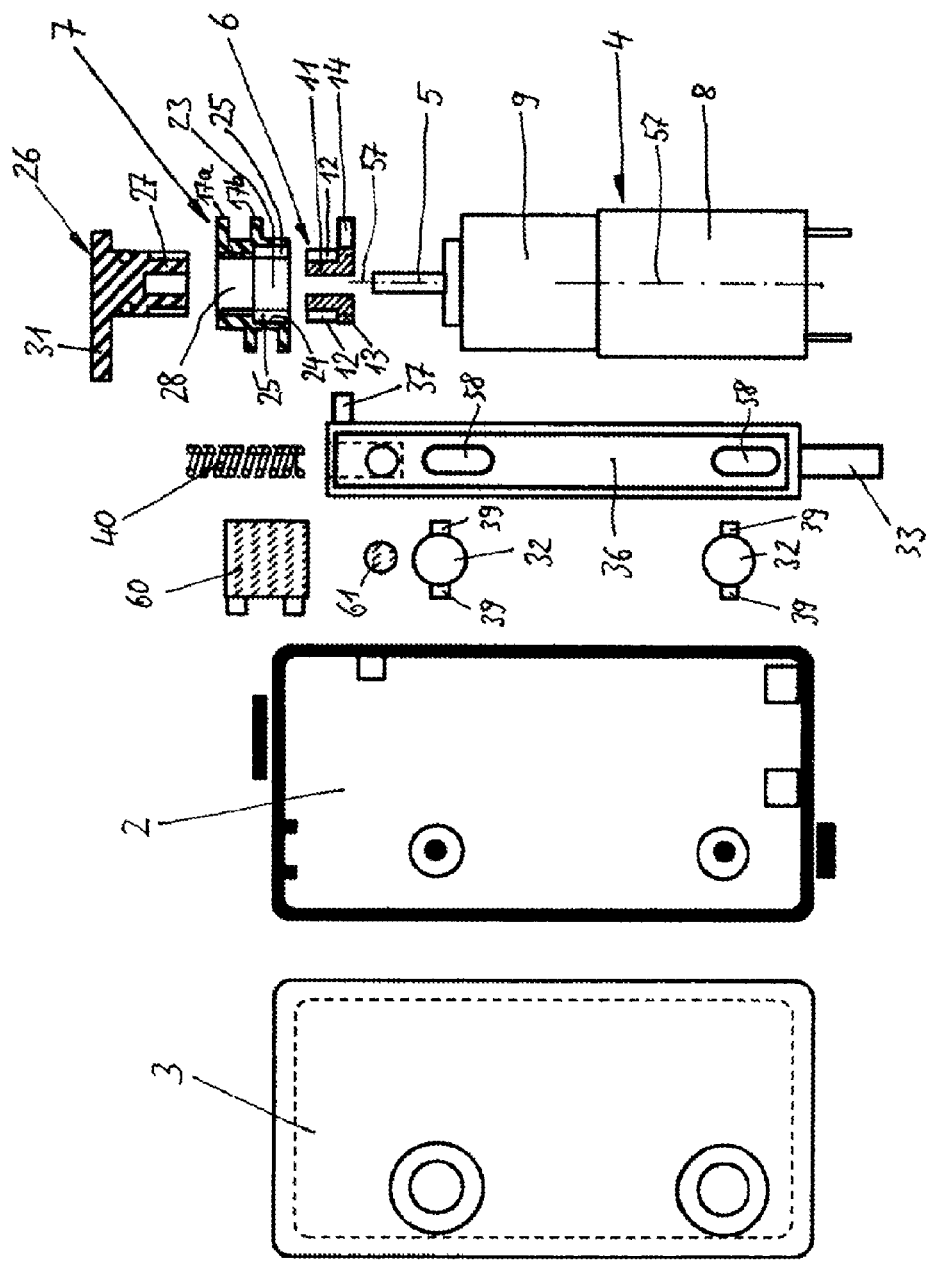
FIG. 2 is a side view of the individual parts of the locking device from FIG. 1.

A motor 4 comprising a motor shaft 5, an entraining element 6 and a rotary link element 7 are arranged in succession within the housing in the longitudinal direction of a rotational axis 57 of the motor 4 (FIG. 2).

The motor 4 is an electric motor in the form of a small geared motor which comprises a motor unit 8 and a planetary gear train 9, which is arranged so as to be flush with the motor unit 8. A planetary gear train 9 is advantageous since it allows a high speed-reduction ratio in the smallest possible space.

The entraining element 6 is fitted onto the motor shaft 5 and is connected thereto for conjoint rotation. For this purpose, the entraining element 6 has a central axial hole 10. Furthermore, the entraining element 6 comprises a cylindrical base body 11. Two entraining stops 12 which are offset by 180° project in the radial direction from the outer peripheral surface of the base body 11. Said entraining stops 12 are formed as axially extending bars. A disc body 13 is formed on the base body 11, is positioned on the end face of the base body 11 facing the motor 4 and has a greater outer diameter than the base body 11. A rotation-limiting stop 14 projects in the radial direction from said disc body 13 and cooperates with a housing stop part 15.

The rotary link element 7 comprises a cylindrical sleeve 16. Two parallel link bars 17a, 17b, which extend around the rotational axis 57, project radially outwards from the outer peripheral surface of the sleeve 16, are axially spaced apart and delimit a guide link 18 on either side. The guide link 18 is thus arranged around the central axis of the rotary link element 7 and thus around the rotational axis 57. Expediently, the link bars 17a, 17b and thus the guide link 18 extend over the entire outer periphery of the sleeve 16, that is to say over an angular range of 360°.

As can be seen from FIG. 1 and the progression of the link in FIG. 7, the guide link 18 comprises a plurality of link portions having different inclinations, namely two zero-lift portions 19, 20 and two inclined portions 21, 22. The two zero-lift portions 19, 20 extend at right angles to the rotational axis of the rotary link element 7, that is to say they have an inclination of 0° and are offset from each other in the axial direction. In the embodiment shown in FIG. 7, the inclined portions 21, 22 extend at an angle of from −15° to +15° to the adjacent zero-lift portions 19, 20. Angles or inclinations of the inclined portions 21, 22 of between −10° and −40° and between +10° and +40° respectively are advantageous. Furthermore, each of the two zero-lift portions 19, 20 is connected on either side by the two inclined portions 21, 22 so that a continuous guide link 18 is produced. The individual link portions extend in a straight line; however, they may also have various different curved shapes and inclinations.

The sleeve 16 of the rotary link element 7 has a cavity 23 over part of its length, into which cavity the base body 11 can be axially inserted together with the entraining stops 12. The cavity 23 is defined by an inner peripheral wall 24. Two bar-like counter-stops 25 project radially inwards from this inner peripheral wall 24 and project into the rotational region of the entraining stops 12. The counter-stops 25 are arranged opposite each other, that is to say offset by 180°. The rotary link element 7 is thus rotatably arranged on and relative to the entraining element 6 such that the entrainer 6 which is driven by the motor 4 can be rotated by a certain free-wheeling angular range, in the example shown, of 120° relative to the rotary link element 7, without the rotary link element 7 being rotated therewith. A rotary free-wheel is thus provided between the entraining element 6 and the rotary link element 7 and decouples the rotational movement of the motor 4 from that of the rotary link element 7 over the predetermined free-wheeling angular range. At the end of the free-wheeling angular range, the entraining stops 12 strike the counter-stops 25 of the rotary link element 7, whereby the rotary link element 7 is rotated therewith.

The rotational movement of the entraining element 6 and thus that of the motor 4 is in turn limited by the rotation-limiting stop 14, which can strike the end faces 15a, 15b of the housing stop part 15 depending on the rotational direction. In the embodiment shown, the entraining element 6 has a free rotational-angle range between the end faces 15a, 15b of approximately 240°.

An emergency rotary element 26 is connected to the rotary link element 7 for conjoint rotation. Said emergency rotary element 26 comprises a cylindrical body 27 which can be inserted in the axial direction into a corresponding cavity 28 in the rotary link element 7 and for example is connected to the rotary link element 7 for conjoint rotation by a tongue and groove connection. A cylindrical bearing portion 29 is attached to said cylindrical body 27, on which bearing portion the emergency rotary element 26 is rotatably mounted in a bearing opening 30 in the lower housing part 2. The rotary link element 7 is thus rotatably mounted in the housing via the body 27 of the emergency rotary element 26. Furthermore, the emergency rotary element 26 comprises a handle part 31 which is arranged outside the housing. In the event that the motor 4 fails, the emergency rotary element 26 makes it possible to manually rotate the rotary link element 7 such that the locking device is unlocked.

A plug (not shown in FIG. 1) is locked and unlocked via two parallel locking bolts 32 which are arranged transversely to the longitudinal and rotational axis of the motor 4 or via an additional locking bolt 33 which is arranged in parallel with the longitudinal and rotational axis 57 of the motor 4. Owing to this plurality of locking bolts 32, 33, it is possible to use the locking device for a large number of different plug connections and to install the locking device in the optimal manner in each case, depending on the availability of installation space. Within the context of the invention, however, a relatively low number of locking bolts, in particular a single locking bolt 32 or 33, is also sufficient.

The locking bolts 32 penetrate openings 34 in the housing cover 3 and are movably mounted therein. The locking bolt 33 penetrates an opening 35 in the lower housing part 2 and is likewise movably mounted therein. In the locking position, the locking bolts 32, 33 project beyond the housing cover 3 and the lower housing part 2 respectively and cooperate in a locking manner with a plug, as is described later in greater detail on the basis of FIGS. 11 to 14. By contrast, in the unlocking position, the locking bolts 32, 33 are retracted into the housing to the extent that they move out of the insertion region of the plug.

Figure 3:
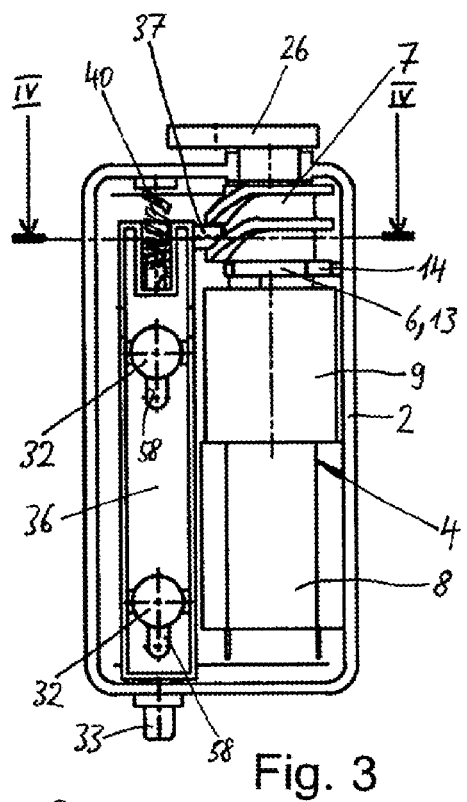
FIG. 3 is a side view of the locking device without a housing cover, the locking bolts being in the locking position thereof.
Figure 5:
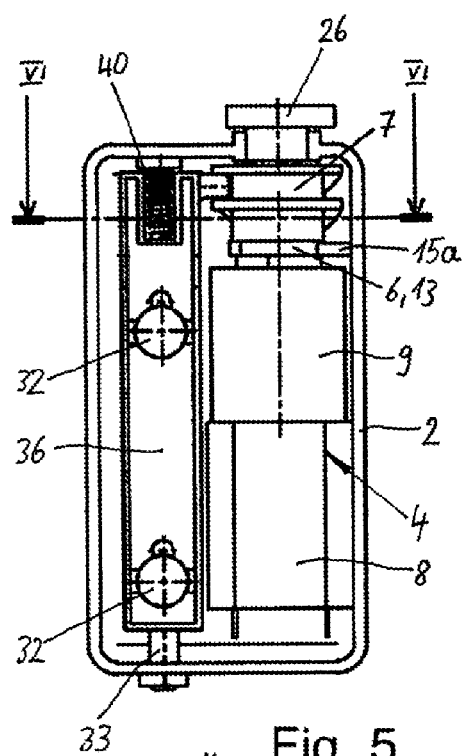
FIG. 5 is a side view of the locking device without a housing cover, the locking bolts being in the unlocked position thereof.
Figure 4:
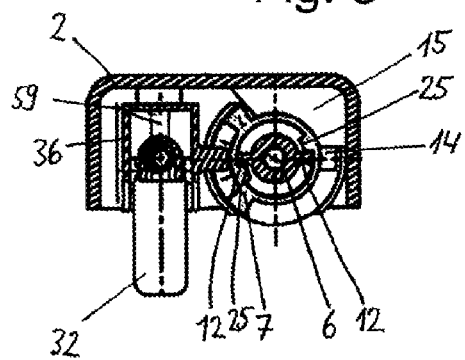
FIG. 4 is a section along the line IV-IV from FIG. 3.
Figure 6:
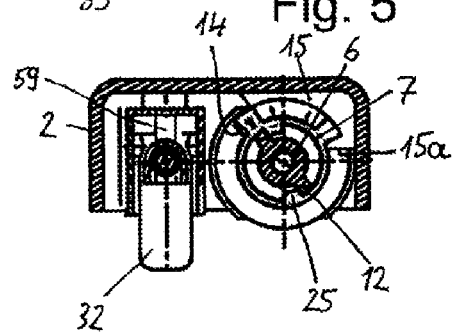
FIG. 6 is a section along the line VI-VI from FIG. 5.

The locking bolts 32 are moved via an elongate slide element 36 which is arranged in parallel with the motor 4 and directly beside said motor, and can move in slot guides 58 on guide bolts 59 (FIGS. 3 and 4) longitudinally and in parallel with the rotational axis 57. The guide bolts 59 also project into longitudinal holes in the locking bolts 32, so that the locking bolts 32 are guided in a longitudinally movable manner on the guide bolts 59.

A link engagement part 37 in the form of an entraining bolt is attached to the slide element 36, which part is attached to the side of the slide element 36 and projects laterally. This link engagement part 37 forms a "link block" which engages in the guide link 18 of the rotary link element 7. By rotating the rotary link element 7, the link engagement part 37 and therefore also the slide element 36 are thus moved in the axial direction of the slide element 36.

Since the locking bolt 33 is directly and rigidly attached to the end face of the slide element 36, the movement of the slide element 36 is directly transferred to the locking bolt 33.

By contrast, the locking bolts 32 are moved by means of two locking-bolt guide links 38 which are provided in the slide element 36 in an obliquely extending manner. Guide pins 39 of the locking bolts 32 engage in said locking-bolt guide links 38. Since the locking-bolt guide links 38 extend obliquely to the movement direction of the locking bolts 32, a longitudinal movement of the slide element 36 causes a longitudinal movement of the locking bolts 32 which is at right angles thereto.

Expediently, the slide element 36 has a U-shaped cross section, so that the locking-bolt guide links 38 can be provided in two opposing side walls of the slide element 36 and the locking bolts 32 can be guided on either side by means of two guide pins 39 in each case.

The slide element 36 is pre-tensioned in the locking position via a spring 40. Said spring 40 is supported at one end on the slide element 36 and at the other end on the lower housing part 2.

The position of the slide element 36 can be detected via a sensor 60 which is provided on the housing cover 3 and cooperates with a magnet 61 which is attached to the slide element 36.

The operation of the locking device is described in the following on the basis of FIGS. 3 to 8. The starting position is the locking position shown in FIGS. 3 and 4, in which the two locking bolts 32 or the locking bolt 33 project beyond the housing. In this locking position, the rotary link element 7 is in a rotational position in which the link engagement part 37 of the slide element 36 is located in the lower zero-lift portion 19 of the guide link 18, shown in FIGS. 3 and 7. The entraining element 6 and the rotary link element 7 are in a position which is shown in FIG. 8a. The rotation-limiting stop 14 of the entraining element 6 rests on the end face 15a of the housing stop part 15.

If the motor 4 is now started in order to unlock the locking device, the entraining element 6 is first rotated clockwise by the motor 4 into the position shown in FIG. 8c over a free-wheeling angular range of 120°, referred to in FIG. 8c as the idle path of the motor, without the rotary link element 7 being rotated therewith. The link engagement part is therefore still in the region of the lower zero-lift portion 19, that is to say the locking bolts 32, 33 have not yet been moved. If the entraining element 6 is then rotated further clockwise by the motor 4 into the position shown in FIG. 8d, the entraining stops 12 carry the counter-stops 25 of the rotary link element 7 therewith, so that the rotary link element 7 and thus the guide link 18 is rotated. This rotational movement leads to the link engagement part 37 being moved over the inclined portion 22 in the axial direction of the rotary link element 7 and of the slide element 36 until it reaches the additional (upper) zero-lift portion 20 of the guide link 18. As a result, the slide element 36 is raised into the position shown in FIG. 5, that is to say the locking bolts 32, 33 are retracted into the housing. The rotational movement of the motor 4 is limited by the rotation-limiting stop 14 after a total of 240°, which stop strikes the end face 15b of the housing stop part 15. In the position shown in FIG. 8d, the locking device is thus in its unlocking position.

In order to lock the device again, the entraining element 6 is first swivelled back anti-clockwise, starting from the position shown in FIG. 8d, over a free-wheeling angular range of 120°, without the rotary link element 7 being rotated therewith. When rotated further clockwise, however, the entraining stops 12 carry the counter-stops 25 of the rotary link element 7 therewith until the position shown in FIG. 8a is reached. Owing to this rotational movement, the link engagement part 37 is guided from the upper zero-lift position 20, via the inclined portion 22, back into the lower zero-lift position 19, whereby the slide element 36 is moved into the position shown in FIG. 3, that is to say moved downwards, and the locking bolts 32, 33 are extended from the housing.

FIG. 8b shows that the rotary link element 7, starting from the locking position shown in FIG. 8a, can be manually rotated anti-clockwise, over a free-wheeling angular range of 120°, into the unlocking position by means of the emergency rotary element 26 if the motor fails. During this rotational movement, the link engagement part 37 travels from the lower zero-lift portion 19, via the inclined portion 21, into the upper zero-lift portion 20. This rotational movement is referred to in FIG. 8b as "Emergency operation OPEN".

FIG. 8e shows that, starting from the unlocking position shown in FIG. 8e, in which the link engagement part 37 is in the upper zero-lift portion 20, if the motor 4 fails, the rotary link element 7 can be manually rotated further clockwise over a free-wheeling angular range of 120°, without the slide element 36 and thus the locking bolts 32, 33 being moved. The shape of the guide link 18, which is shown in FIG. 7, is therefore designed such that only emergency unlocking is possible, and not emergency locking.

On the basis of FIGS. 9 and 10, another embodiment of a guide link 18' is described in the following which also allows emergency locking in addition to emergency unlocking. Said guide link 18' has, in the same way as the guide link 18, a lower zero-lift portion 19 to which two inclined portions 21, 22 are attached. An upper zero-lift portion 20a is attached to the inclined portion 21, while an upper zero-lift portion 20b is attached to the inclined portion 22. An inclined portion 41a which leads downwards is in turn attached to the upper zero-lift portion 20a, while an inclined portion 41b which leads obliquely downwards is attached to the upper zero-lift portion 20b. The inclined portions 41a, 41b are interconnected by a lower zero-lift portion 42.

The guide link 18' which is shown in an angled manner in FIG. 9 allows for rotational movements of the entraining element 6 and the rotary link element 7 which are shown in FIGS. 10a to 10e. In this case, the two opposing counter-stops 25 of the rotary link element 7 are formed such that a free-wheeling angular range of 90° is made possible.

FIG. 10a again shows a relative position between the entraining element 6 and the rotary link element 7 in which the locking device is in the locking position, that is to say the link engagement part 37 is in the lower zero-lift portion 19. Starting from the position shown in FIG. 10a, it is possible to rotate the rotary link element 7 manually anti-clockwise by 90° into the position shown in FIG. 10b by means of the emergency rotary element 26 if the motor 4 fails. In so doing, the link engagement part 37 travels into the upper zero-lift portion 20a via the inclined portion 21. The locking device is thereby unlocked.

By contrast, if the motor 4 is in good working order, starting from the position shown in FIG. 10a, the motor and the entraining element 6 can first rotate clockwise over a free-wheeling angular range of 90°, without the rotary link element 7 rotating therewith. If the motor 4 rotates further clockwise, until the rotation-limiting stop 14 strikes the end face 15b of the housing stop part 15, the rotary link element 7 is rotated therewith by a further 90°. The link engagement part 37 travels along the inclined portion 22 into the upper zero-lift portion 20b and thus transfers the locking device into the unlocking position. If the motor 4 fails in this unlocking position, it is possible to manually rotate the rotary link element 7 further clockwise by 90° into the locking position shown in FIG. 10e.

Figure 11:
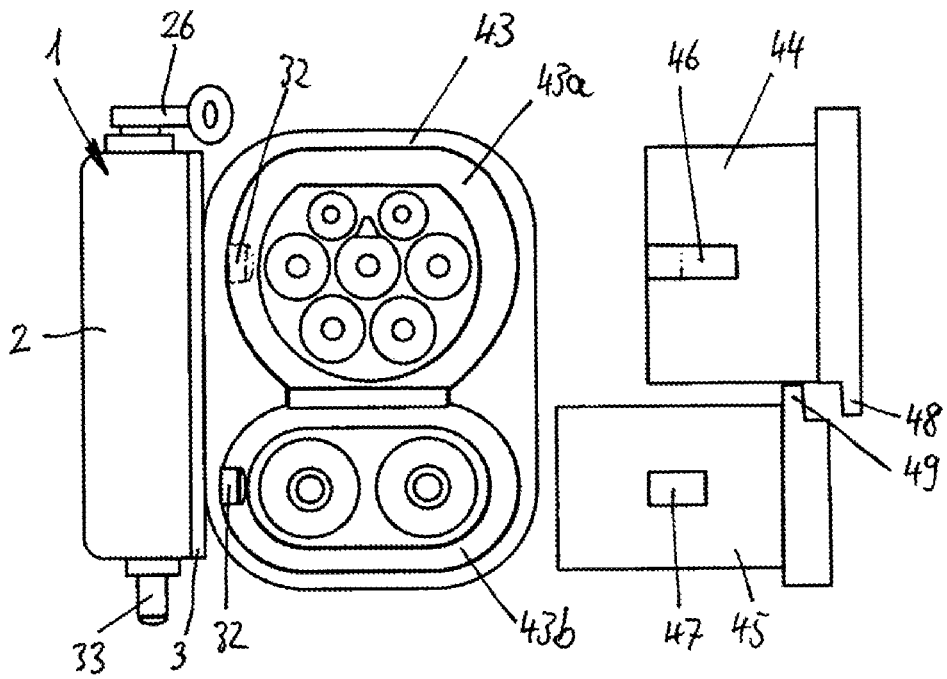
FIG. 11 shows an embodiment for the combination of a locking device with a socket which can be covered by covering caps.

FIG. 11 shows a first example of use of the locking device 1. It is an end-face view of a socket 43 (power point) which comprises two different plug connectors 43a, 43b in order to provide connection options for alternating current as well as for direct current. In this embodiment, the locking device 1 is arranged transversely to the socket 43, that is to say the longitudinal axes of the motor 4 and of the slide element 36 extend transversely to the longitudinal axis of the socket 43. It is clear that the two locking bolts 32 can be moved laterally both into the plug connector 43a and into the plug connector 43b in order to lock a plug (not shown). Here, the locking bolts 32 engage in lateral wall openings in the plug.

FIG. 11 also shows two covering caps 44, 45, intended for covering the socket 43, in a position rotated by 90°, that is to say in a side view. The covering caps 44, 45 have wall openings 46, 47 in the wall thereof which are designed and arranged such that, after the covering caps 44, 45 are inserted into the plug connectors 43a, 43b, the locking bolts 32 engage in said wall openings 46, 47 and can lock the covering caps 44, 45. In addition, the covering caps 44, 45 may have overlapping edge regions 48, 49, so that the covering cap 45 can only be removed once the covering cap 44 has been removed. In this embodiment, the additional locking bolt 33 could be used for locking an outer flap on the bodywork.

Figure 12:
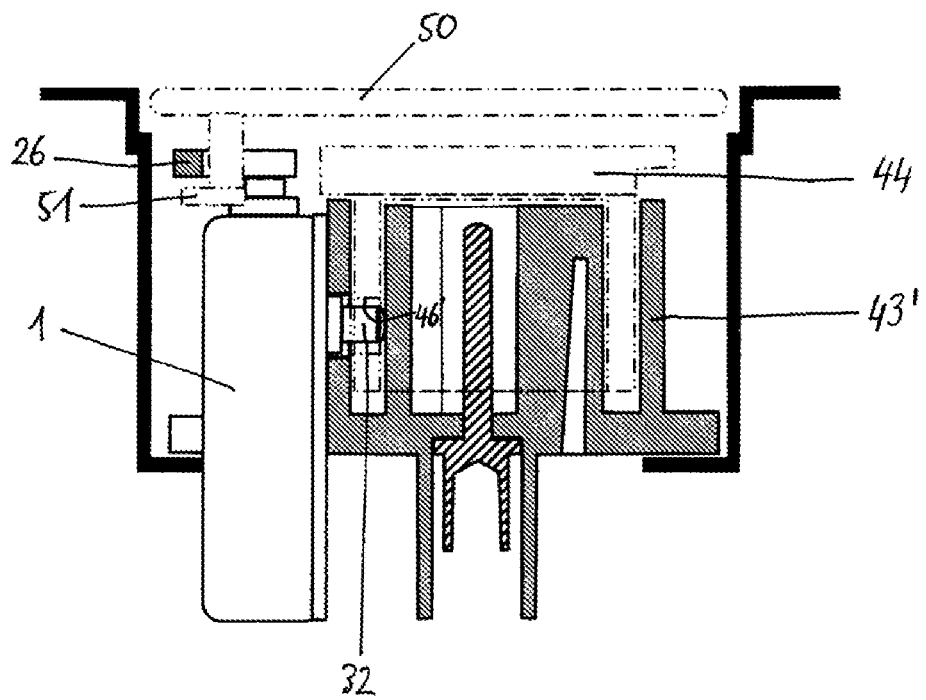
FIG. 12 shows a further embodiment for the combination of a locking device with a socket.

FIG. 12 shows a further example of use for locking an alternating-current connector. In this embodiment, the locking device 1 is installed in the longitudinal direction of the socket 43'. A covering cap 44 (shown by a dot-dash line) is inserted into the socket 43'. The locking device 1 only comprises one transversely arranged locking bolt 32, which engages in a lateral wall opening 46 in the covering cap 44 in the locking position of said bolt. Instead of the covering cap 44, in the same way an electric plug which has been inserted into the socket 43' can be locked. Furthermore, in this example of use it can be seen that the emergency rotary element 26 can also be used for locking an outer flap 50 on the bodywork by the emergency rotary element 26 overlapping with a locking hook 51 on the outer flap 50 on the bodywork in a certain rotational position. In this rotational position, the outer flap 50 on the bodywork cannot be lifted up. However, if the locking device 1 is brought into the unlocking position, the emergency rotary element 26 is rotated such that the outer flap 50 on the bodywork is free to be lifted up.

Figure 13:
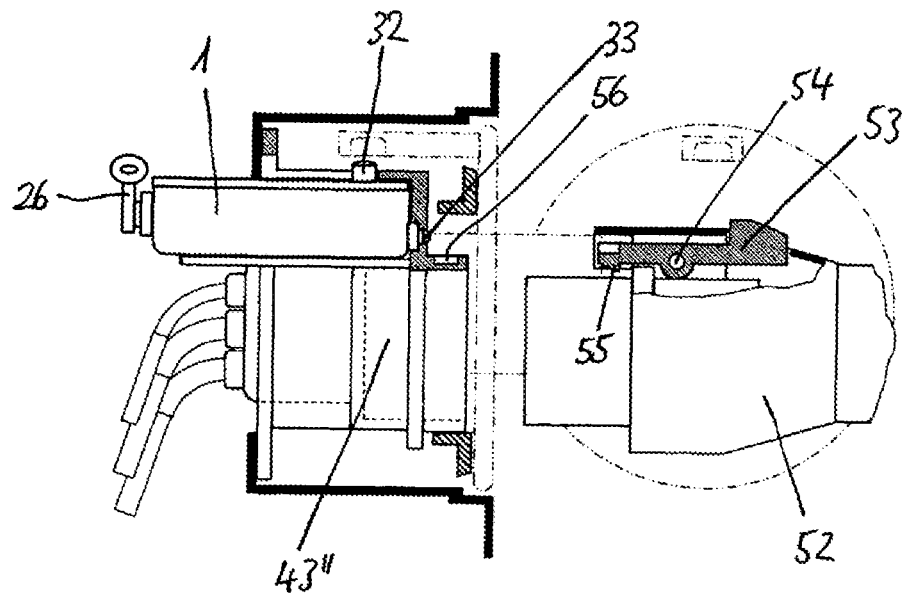
FIG. 13 shows a further embodiment of a combination of a locking device with a socket for locking a plug provided with a snap-in hook.
Figure 14:
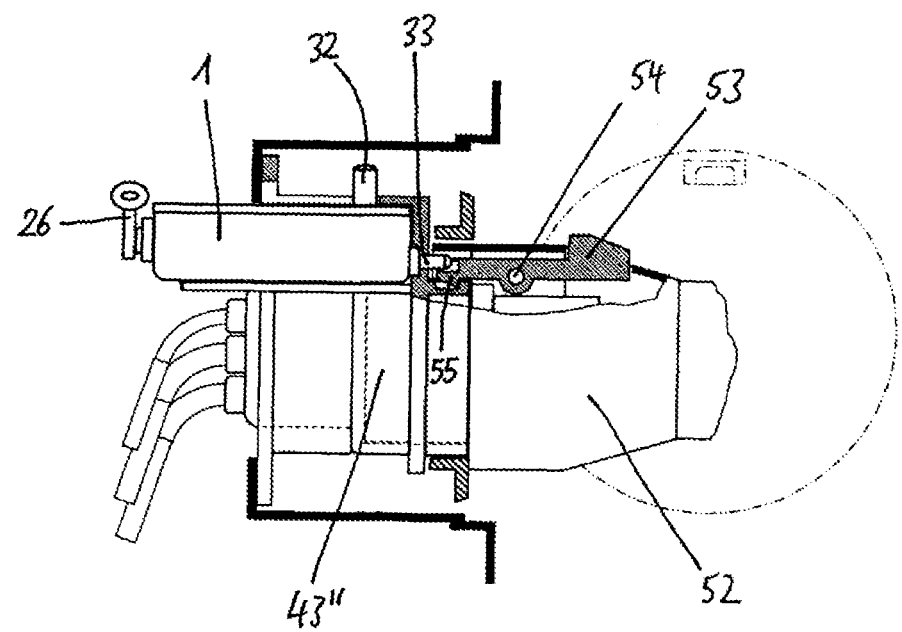
FIG. 14 shows the embodiment from FIG. 13, the plug being in the locked position.

FIGS. 13 and 14 show a further example of use of the locking device 1 according to the invention. In this embodiment, the locking device 1 is installed longitudinally beside the socket 43". In this embodiment, a plug 52 is used which comprises a snap-in hook 53. The snap-in hook 53 can be pivoted about a pivot axis 54 which extends transversely to the longitudinal direction of the plug 52, and comprises a locking hook 55 on its front end which, when the plug 52 is inserted, can be brought into locking engagement with a recess 56 in the peripheral wall of the socket 43". The locking device 1 may now be arranged such that the locking bolt 33, which can be moved in the axial direction of the slide element 36, overlaps in its locking position with the snap-in hook 53 at the front end thereof, such that the snap-in hook 53 is prevented from pivoting into its open position.

Within the context of the invention, many variations are possible. For example, it is possible to mount the locking device 1 not on a socket but on a plug which is arranged on a vehicle, a charging station or the like. The guide link 18, 18' does not have to comprise a plurality of inclined portions 21, 22. In accordance with a minimal design, it is sufficient for two zero-lift portions 19, 20, which are offset in the axial direction of the rotary link element 7, and an inclined portion 21 or 22 arranged therebetween to be provided. It is also readily possible to provide a relatively large number of link portions or another arrangement thereof as the link portions 19, 20, 20a, 20b, 21, 22, 41a, 41b disclosed in the embodiments. The emergency rotary element 26 and the rotary link element 7 may also consist of a single part. It is also not entirely necessary for two entraining stops 12 and/or counter-stops 25 which are offset by 180° to be provided. A single entraining stop 12 and/or counter-stop 25 may be sufficient. The emergency rotary element 26 may be omitted if emergency unlocking is not desired. Furthermore, emergency unlocking may be provided in a different way, for example by the guide link 18, 18' only comprising a single link bar 17b, against which the link engagement part 37 is pressed by means of the spring 40 so that the slide element 36 can be manually retracted counter to the pre-tensioning force of the spring 40.

Furthermore, embodiments are also included by the invention in which the rotary link element 7 is not arranged on or flush with the motor shaft 5, but rather beside the motor 4. It is particularly expedient here for the rotary link element 7 to be arranged on a shaft which is arranged in parallel with the motor shaft 5 and is rotatably mounted in the housing, in particular on the lower housing part 2. In this case, the motor shaft 5 and the rotary link element shaft are expediently rotatably connected by means of a gear train which brings about a large speed reduction, which gear train may for example be a spur gear. This gear train does not have to form a unit together with the motor 4, but rather may be arranged outside the motor housing itself. Furthermore, it is also possible for the rotary link element 7 and the slide element 36 to be arranged so as to be flush with each other and for the rotary link element 7 to extend into the slide element 36 at least in part. In this case, the rotary link element 7 and the slide element 36 can be coupled by at least one link engagement part 37, preferably two opposing link engagement parts 37, which extend(s) inwards from the inner wall of the slide element 36 and engage(s) in the guide link 18 of the rotary link element 7. In this last-mentioned embodiment, it is also expedient for the emergency rotary element 26 to be attached to the rotary link element shaft for conjoint rotation in order to manually rotate the rotary link element 7. Rather than being attached to the slide element 36, the magnet 61 may also be attached to the rotary link element 7 and the associated sensor 60, in particular a Hall sensor, may be arranged on the housing so as to be adjacent thereto.

The invention claimed is:

1. Locking device for locking electrical plugs in sockets, comprising:
   a motor,
   a rotary element which can be set in rotation by the motor,
   a slide element which is operatively connected to the rotary element,
   at least one locking bold which can be moved by the slide element between an unlocking position and a locking position in which the plug is locked relative to the socket,
   wherein the rotary element is formed as a rotary link element which comprises a guide link which is arranged around a rotational axis thereof and comprises a plurality of link portions which have different inclinations, and in that the slide element comprises a ling engagement part which engages in the guide link and can move in parallel with the rotational axis of the rotary link element by rotating the rotary link element.

2. Locking device according to claim 1, wherein the motor consists of a geared motor which comprises a planetary gear train for reducing the motor speed.

3. Locking device according to claim 1, wherein a rotary free-wheel is provided between the motor and the rotary link element and decouples the rotational movement of the motor from that of the rotary link element over a predetermined free-wheeling angular range.

4. Locking device according to claim 3, wherein the rotary free-wheel comprises a rotatable entraining element which can be driven by the motor and comprises at least one entraining stop which can be brought into entraining engagement with a counter-stop of the rotary link element at either end of the free-wheeling angular range.

5. Locking device according to claim 4, wherein the entraining element is arranged within the rotary link element at least in part.

6. Locking device according to claim 1, wherein the guide link of the rotary in element comprises at least one non-inclined zero-lift portion which extends at right angles to the rotational axis.

7. Locking device according to claim 1, wherein the motor, entraining element and rotary link element are arranged in succession along a common rotational axis.

8. Locking device according to claim 1, wherein the rotary link element is connected to an emergency rotary element for manually rotating the rotary link element.

9. Locking device according to claim 1, wherein the slide element can be moved in parallel with the rotational axis of the rotary link element.

10. Locking device according to claim 1, wherein the slide element is arranged so as to be adjacent to the motor.

11. Locking device according to claim 1, wherein the slide element comprises at least one locking-bolt guide link, and in that the locking bolt is movably mounted relative to the slide element and is in engagement with the locking-bolt guide link such that the locking bolt can be moved in and out of locking engagement with the plug or the socket by a movement of the slide element.

12. Locking device according to claim 1, wherein at least one locking bolt is rigidly attached to the slide element.

\* \* \* \* \*